United States Patent [19]

Prevot

[11] 4,335,650
[45] Jun. 22, 1982

[54] PEELING MACHINE HAVING A ROTATING CUTTER PLATE

[75] Inventor: Olivier H. C. Prevot, Aubusson, France

[73] Assignee: DITO, Aubusson, France

[21] Appl. No.: 235,928

[22] Filed: Feb. 19, 1981

Related U.S. Application Data

[63] Continuation of Ser. No. 92,990, Nov. 9, 1979, abandoned.

[30] Foreign Application Priority Data

Nov. 10, 1978 [FR] France .................................. 78 31851

[51] Int. Cl.³ .......................... A23N 7/00; A47J 17/18
[52] U.S. Cl. ........................................ 99/593; 99/631; 241/92; 241/282.1
[58] Field of Search ................. 99/584, 588, 590, 593, 99/623, 628–634; 241/91–93, 282.1

[56] References Cited

U.S. PATENT DOCUMENTS 3,266,540  8/1966  Bradham .............................. 99/593
3,892,365  7/1975  Verdun ................................. 241/92

FOREIGN PATENT DOCUMENTS 769152   3/1971  Belgium ............................... 99/593
1136071  9/1962  Fed. Rep. of Germany ........ 99/633
1149143  5/1963  Fed. Rep. of Germany ........ 99/623
2352637  5/1974  Fed. Rep. of Germany ........ 99/631

Primary Examiner—Philip R. Coe
Assistant Examiner—Timothy F. Simone
Attorney, Agent, or Firm—Hauke and Patalidis

[57] ABSTRACT

A peeling machine for peeling fruits and vegetables comprising a cutter disc having in its center a boss for mounting the disc to a driving shaft and having a plurality of apertures arranged substantially radially and open into clearances arranged at the periphery of the plate, each said aperture being bounded on its rear side relative to the rotation of the plate by a cutter blade with a sharp edge. The plate may further comprise at least one, and preferably two radial protruding bosses, the upper portion of each of the bosses comprising at least one aperture also bounded on its rear side with a cutter blade whereby the fruit or vegetables to be peeled are stirred during the peeling operation. A peripheral safety guard and a tapered edge may also be provided for the plate.

9 Claims, 15 Drawing Figures

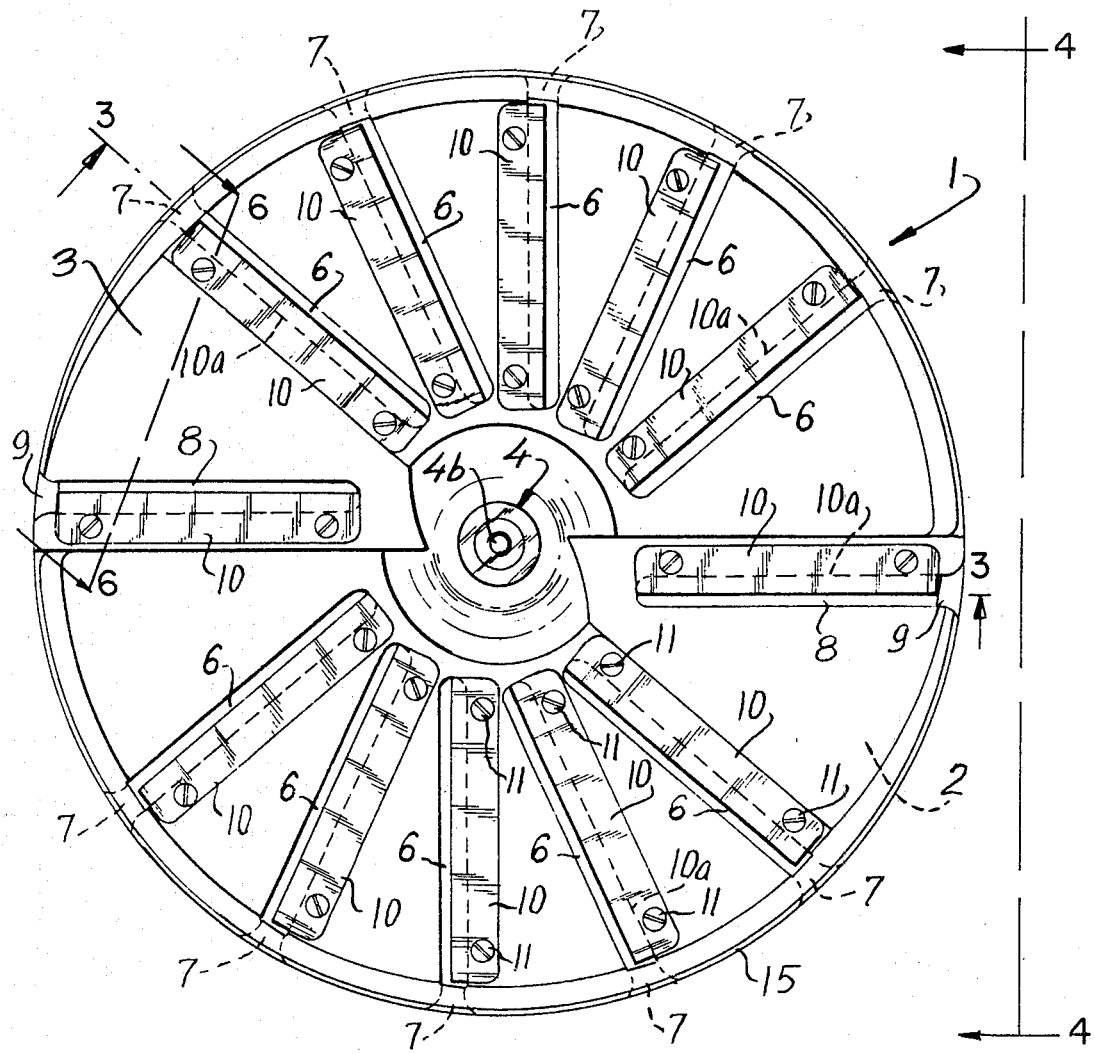
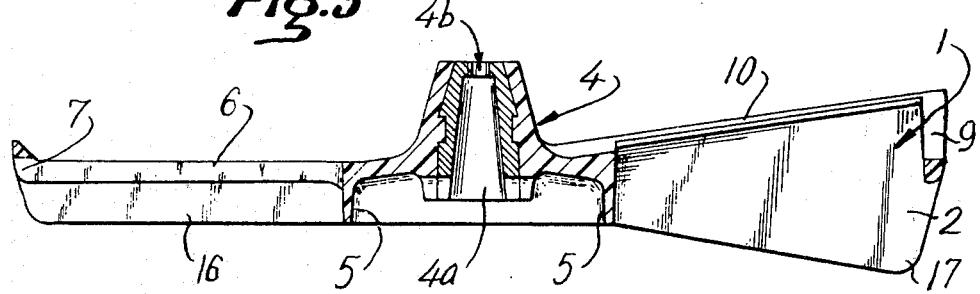

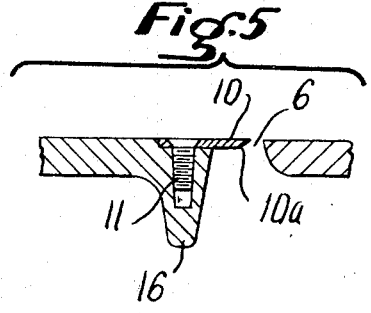
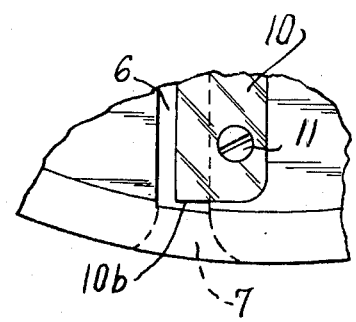
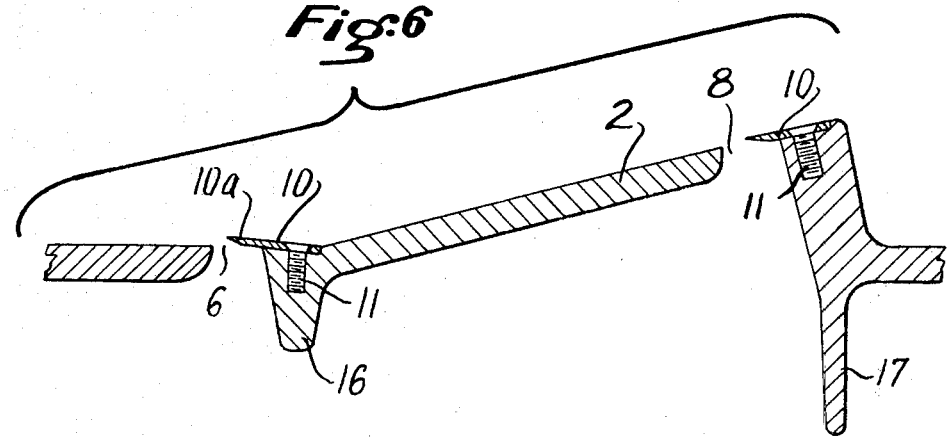
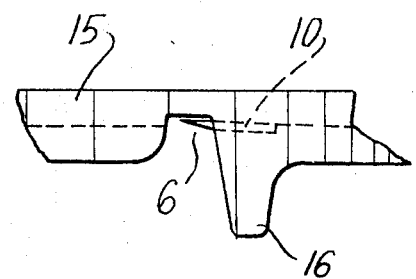

PEELING MACHINE HAVING A ROTATING CUTTER PLATE

This is a continuation of application Ser. No. 092,990, filed Nov. 9, 1979, abandoned.

BACKGROUND OF THE INVENTION

Peeling machines for vegetables and fruits are already known which, in general, comprise a vertical or horizontal cylindrical hopper or tank, the bottom of which or one of the circular sides of which has a rotating plate which can be coated with an abrasive or provided with cutters. However, such machines have not been fully satisfactory since they require the use of large quantities of water or, when they are equipped with a cutter plate, the mounting of said plate is complex and costly. Safety, health and sanitation requirements are not always met since cleaning the rotating plate is necessary but time consuming. Additionally, the active portion of each cutter is fragile. Some devices impose special operating requirements, such as, for example, the requirement of a water bath, which entails many design and operational difficulties.

The object of the present invention is to remedy the above-mentioned disadvantages while enabling the peeling machine to perform work of good quality comparable to that from a manual peeling operation.

SUMMARY OF THE INVENTION

According to the invention, the peeling machine comprises a generally cylindrical tank and a cutting plate, the plate having a central boss for mounting on and coupling to the drive shaft, a plurality of apertures arranged substantially radially, and opening into clearances in the periphery of the plate, each of said apertures being bounded on the trailing side thereof relative to the direction of rotation of the plate by a cutter blade with sharpened edge so as to shear fruit and vegetable peels by means of a sliding cutting action, the plate further having an upper portion provided with protruding bosses, preferably two diametrically opposite bosses substantially shaped as a trihedron, the upper portion of each of said bosses comprising at least one opening extended by a flared clearance at its outer portion, said opening being bounded by a cutter blade, whereby the vegetables to be peeled are stirred in the vat by said bosses during the peeling operation.

Various further features, objects and advantages of the invention will become more apparent to those skilled in the art from the following detailed description of the preferred embodiments. Examples of structure of the invention are shown, not by way of limitation, in the appended drawings wherein:

BRIEF DESCRIPTION OF THE DRAWING

FIG. 1 is a top view of the cutter plate of a peeling machine according to the invention;

FIG. 3 is a cross-sectional view taken along line 3—3 of FIG. 1;

FIG. 5 is a cross-sectional view taken along line 5—5 of FIG. 2;

FIG. 6 is a somewhat schematic cross-sectional view of FIG. 1 taken along line 6—6 thereof;

FIG. 7 is an enlarged partial top view of the cutter plate;

FIGS. 8 and 9 are enlarged partial side elevational views of the plate;

DETAILED DESCRIPTION OF THE PREFERRED EMBODIMENTS

Focusing now on the drawings and more particularly on FIG. 1 thereof, illustrating an example of a cutter plate 1 according to the present invention for placement within a cylindrical hopper or tank, not shown, the cutter plate 1 comprises a disc generally made of a sufficiently rigid synthetic or natural material to which can be applied various machining operations enabling in particular the mounting of cutter blades 10.

Figure 2:
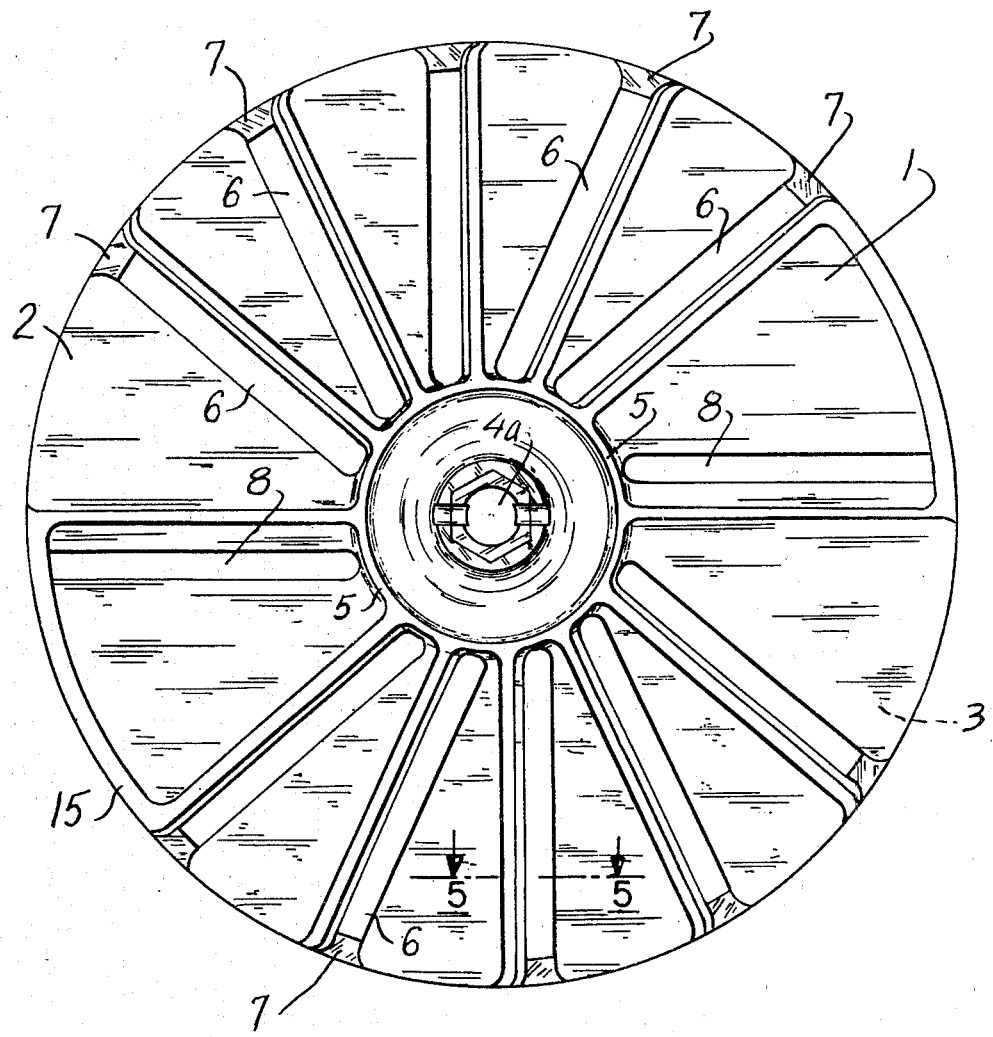
FIG. 2 is a bottom view of the plate of FIG. 1.
Figure 4:
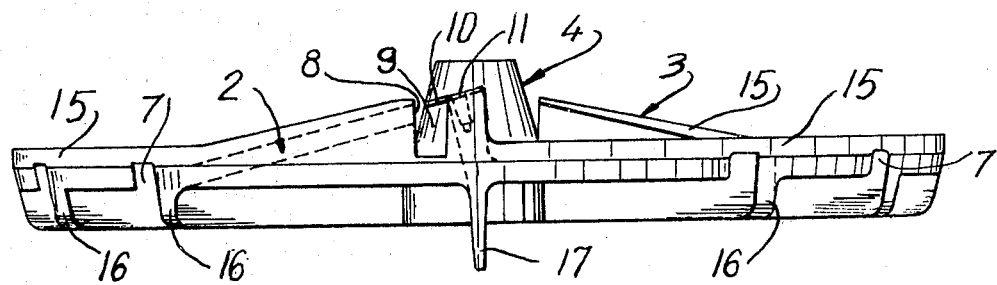
FIG. 4 is a side elevation view of the plate of FIGS. 1-4 as seen from line 4—4 of FIG. 1.

As shown in FIGS. 3 and 4, the plate 1 is formed with two large bosses 2 and 3 arranged symmetrically relative to a diameter of the disc. The bosses 2 and 3 are identical in shape and have in volume, substantially the shape of a trihedron. The central portion of the disc 1 comprises a vertical boss 4 of a cylindrico-conical shape, the central portion of which is hollowed to form a recess 4a which is frustoconical in shape and extended by a cylindrical channel 4b. At the lower portion of the disc, the central boss is reinforced by a cylindrical edge forming a dome 5.

Between the two bosses 2, 3 are provided evenly distributed apertures 6 opening on their outer portion into clearances 7 each having a flared-out shape, the function of which will be explained hereafter.

On the bosses 2, 3 are also provided apertures 8 flaring out at their outer end 9, FIGS. 3 and 6. In front of each aperture 6 or 8 are mounted cutter blades 10, the sharp edge 10a of which protrudes above the apertures 6 or 8, as diagrammatically shown in FIG. 6. Generally, the cutter blades 10 are fixed on the plate by screws 11 the head of which is sunk so as to avoid accumulation of deposits of material the fermentation of which could be dangerous.

Figure 9:
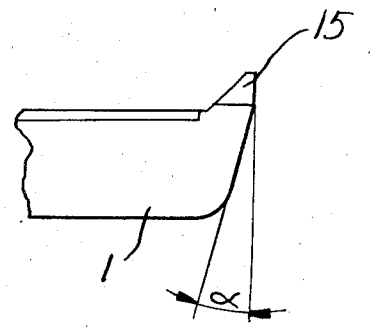

The outer margin of the plate 1 comprises a vertical edge 15 which is substantially triangular shape in cross-section, as shown in FIG. 9. Moreover, the lower portion of the plate 1, as shown in FIG. 9, may be formed originally with a tapered shape having an angle α between 5° and 15°.

Under the plate 1 and on the edge of its openings 6 and 8 (see FIG. 8) are formed ribs or overthicknesses 16 directed downwardly and designed to make the plate rigid. Under the bosses 2 and 3 are provided larger ribs or paddles 17 mating with the shape of the bottom of the peeling chamber of the machine and providing the discharge of the waste and water, FIG. 4. The paddles 17 also function as stiffeners.

Figure 10:
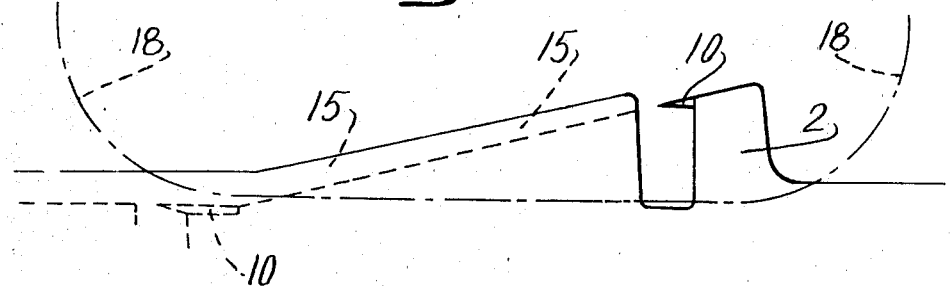
FIG. 10 is a schematic view diagram illustrating the safety guard.

As shown schematically in FIG. 10, the peripheral edge 15 of the plate 1 is arranged so that when one opens the outlet door 18 for the peeled off fruits and vegetables, the operator cannot come in direct contact with the upper surface of the plate since the edge 15 forms a safety guard sufficient to avoid an accident, such as having one or several fingers cut when coming into contact with the cutter blades 10.

Figure 11:
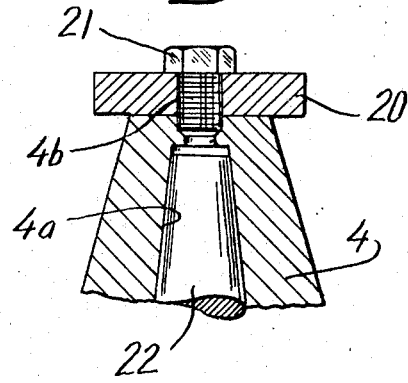
FIGS. 11 and 12 are partial cross-sectional views similar to that of FIG. 3 illustrating the means of attaching the plate to the drive shaft.
Figure 12:
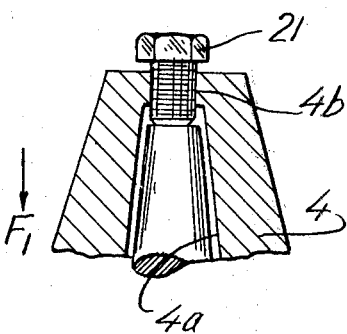

FIG. 11 illustrates how the central recess 4a allows maintaining the plate 1 on the conical shaft 22 connected to the motor. After the machine has been operated a sufficiently long period of time, it is possible that the conical fit will be totally tightened and sometimes even glued due to the presence of starch, in which event disassembling of the plate 1 could become extremely difficult. When that occurs, the operator will need to unfasten the screws 21, remove the washer 20 and refasten the screw 21 which act as a wheel-drift while exerting on the plate 1, through the boss 4, a downward force in direction of arrow $F_1$, as shown in FIG. 12, extracting the conical shaft 22.

In the machine which has just been described above, all of the peeling action is caused by the rotating plate 1 which is placed at the base of the peeling chamber. The arrangement of the cutter blades 10 may vary slightly. But generally, each blade is arranged along a radius, its sharp edge 10a being offset in front of the radius, as shown particularly in FIG. 1, so as to obtain a sliding cut providing a better quality of work.

The bosses 2 and 3 which each form a ramp compel the vegetables and fruits to be peeled to travel in the peeling chamber or tank and improve the peeling efficiency, particularly since the bosses are provided with cutter blades 10. It is thus obvious that the bosses 2 and 3 represent the most active portion of the plate 1.

Although a monoblock or unitary plate has been described, it is possible to use a plate comprising a circular support suitably formed with holes and on which are mounted, permanently or removably, independent elements in the shape of circular sectors forming together a support for the above-described cutter blades and bosses. The latter embodiment makes post-sale maintenance easier and reduces manufacturing costs.

However, it should be noted that for more efficiency, it is important that the cutters be tightly fastened on the plate 1. Actually, and as shown in FIGS. 1, 6 and 8, the cutters 10 may be placed parallel to the upper plane of the disc 1 or slightly inclined relative to the latter, the sharp edge being oriented upwardly. This inclination is originally provided by the shape given to the plate, without any possibility of later adjustments or modifications. This is important for at least two reasons. First, the user will be able to disassemble and reassemble the cutters very easily without need for any adjustment. Secondly, from the hygiene point of view, any hole or protruding screw must be avoided in order to meet the safety standards in force in the majority of the countries where such machines are used.

The plate 1 has been designed so that the peeling machine permanently retains all of its efficiency. Therefore, it is necessary that all the cutter blades 10 be free always from the peelings or waste. It is for this reason that the arrangement of the plate is such that the openings 6 and their flared out ends 7 form clearances at the periphery of the plate to enable a very easy discharge of the peelings which are removed or ejected due to the centrifugal force on the one hand and due to the above-described sliding cutting operation on the other hand. Finally, the taper of angle $\alpha$ (FIG. 9) of the outer ring of the plate easily completes the discharge action of the peelings.

Since the rotating plate comprises sharp cutters, it is necessary to take safety precautions so as to avoid any accident. It is therefore also contemplated that the cutting thicknesses will be very small and within the range of only a few tenths of a millimeter.

The plate, the dangerous area of which is situated at a lower level relative to the opening of the discharge door 18 for the peeled off vegetables (FIG. 10), preferably comprises a peripheral guard 15 which neatly projects upwardly relative to the level of the cutters 10 so that the user may not come in direct contact with the cutter blades 10 even when the plate is rotating As shown in FIGS. 4 and 10, this guard 15 extends on the bosses 2 and 3 to the cutters which are situated on the highest level. Thus, if the user places his fingers inside the door opening, he cannot inadvertently encounter the cutter blades due to the presence of this safety guard 15.

Moreover, because of the arrangement of the cutter blades 10, the plate does not represent any potential danger for the user should he introduce his hand through the upper portion of the cylinder of the peeling machine to a depth where he would touch the plate 1, the plate 1 being in rotation or not.

In summary, then, and as the above description illustrates, one may easily operate the plate 1 without risking wounds due to three safety features: (1) the very small cutting thickness, (2) the particular arrangement of the cutter blades 10 and the manner in which they are mounted to their respective supports, and (3) the presence of the safety guard 15 which prevents access to the dangerous angle of the cutter blades 10.

Figure 13:
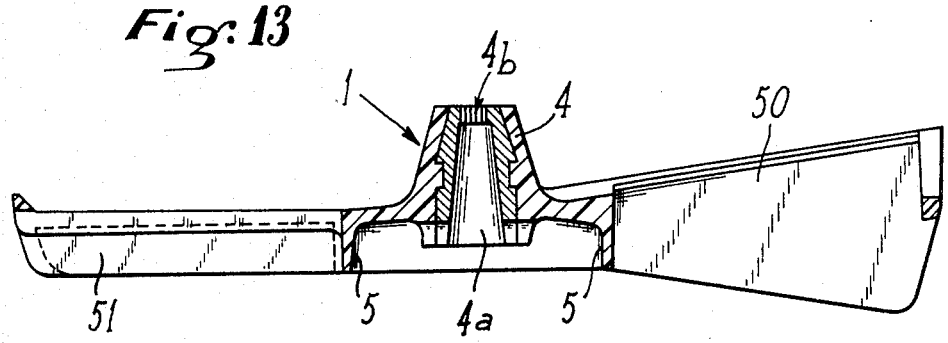
FIG. 13 is a diametral cross-sectional view showing an alternative example of the plate.

In one example of structure for the cutting plate 1, it has only one boss 50, as in FIG. 13. In this case for balancing the plate, a small balancing counter-weight 51 diametrically opposite the boss 50 may be added if necessary, the latter counterweight 51 sometimes comprising a cutter 10.

Figure 14:
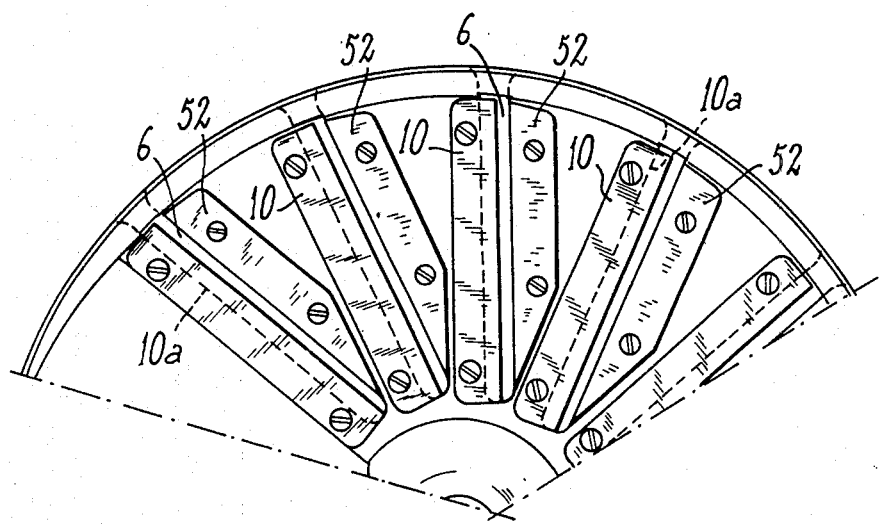
FIG. 14 is a partial plan view of the plate showing a further modification thereof.
Figure 15:
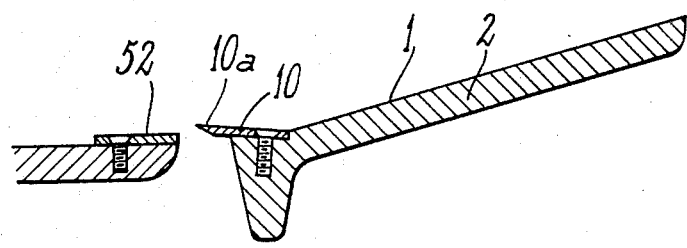
FIG. 15 is a partial cross-sectional view of the plate of FIG. 14.

As shown both in FIG. 14 and in FIG. 15, the cutting thickness may be in some cases determined by the difference in thickness between a cutter 10 and a suitably shaped wedge 52, the assembly formed by the cutters 10 and wedges 52 being easily affixed to the plate since its upper surface is planar. The adjustment of the peeling thickness may be carried out by varying either the thickness of the wedges 52, or the thickness of the cutters 10. The aforementioned wedges and cutters are fixed by any suitable means to the plate in front of the openings 6 and 8.

Likewise, the long downward ribs 16 for making the cutting plate 1 rigid may be formed separately and fastened to the plate 1 instead of being moulded integrally therewith. Moreover these ribs 16 may come in contact with the bottom of the vat so as to facilitate discharge of the waste and water under the plate.

Having thus described the present invention by means of examples of the best modes contemplated at the time of filing for carrying out the invention, variations whereof being obvious to those skilled in the art.

What is claimed as novel is as follows:

1. A peeling machine for peeling vegetables and fruits, comprising a drive shaft and a rotating circular cutting plate, said plate comprising a disk having a substantially flat top surface, a bottom surface and a peripheral edge having a circular peripheral surface, a central boss formed integrally with said disk and having a bore for junction with said drive shaft, a plurality of elongated slot-like apertures arranged substantially radially through said disk from said top surface to said bottom surface and extending from proximate said central boss to proximate said peripheral edge, a plurality of cutter blades each mounted radially on the top surface of said disk proximate one of said slot-like apertures on the rear side thereof relative to the direction of rotation of said disk, each of said cutter blades having a sharpened leading edge projecting on top of one of said slot-like apertures, a plurality of radial clearance and discharge openings through the edge of said disk each placing one of said slot-like apertures in communication with said peripheral surface, at least one upwardly protruding radial boss on the top surface of said disk shaped substantially as a trihedron, said radial boss comprising at least one radial elongated slot-like aperture open into and extended by one of said clearance openings, a cutter blade mounted radially on said radial boss proximate said corresponding radial aperture on the rear side thereof relative to the direction of rotation of said disk, and a safety guard comprising an upwardly protruding barrier formed integrally with said disk proximate said peripheral edge of said disk, and a plurality of radial stiffening ribs each disposed projecting from the bottom surface of said disk below each of said cutter blades.

2. The peeling machine of claim 1 comprising two of said upwardly protruding radial bosses disposed diametrically opposite each other.

3. The peeling machine of claim 1 wherein at least one of said ridges forms a downwardly extending paddle.

4. The peeling machine of claim 1, wherein said peripheral edge of said disk has a downwardly directed taper.

5. The peeling machine of claim 1 further comprising a plurality of wedges radially affixed on the top surface of said disk, each in front of one of said radial apertures, said wedges having each a thickness less than the thickness of said cutter blades.

6. The peeling machine of claim 1 wherein the cutter blades are each mounted in a recess in the top surface of said disk and are affixed therein by taper-headed screws threading in threaded mounting holes in said disk, said cutter blades having corresponding tapered mounting apertures for accepting said screws with the top surface of said screw heads flush with the top surface of said cutter blades.

7. The peeling machine of claim 1 wherein said cutter blades are fastened at a slight angle to the plane of said disk.

8. The peeling machine of claim 1 wherein said bore in said central boss and said drive shaft have corresponding tapered surfaces in mutual engagement.

9. The peeling machine of claim 8 wherein a portion of said bore is threaded for accepting a threaded member having an end engageable with the end of said drive shaft for drifting said drive shaft from said bore.

* * * * *